United States Patent [19]

Miki

[11] 4,208,078
[45] Jun. 17, 1980

[54] CYLINDRICAL ROLLER BEARINGS

[75] Inventor: Toshio Miki, Shimmachi, Japan

[73] Assignee: Koyo Seiko Company Limited, Osaka, Japan

[21] Appl. No.: 923,665

[22] Filed: Jul. 10, 1978

Related U.S. Application Data

[63] Continuation-in-part of Ser. No. 828,965, Aug. 29, 1977, abandoned.

[51] Int. Cl.$^2$ .............................................. F16C 33/46
[52] U.S. Cl. .................................. 308/217; 29/148.4 C
[58] Field of Search ........................ 308/212, 213, 217; 29/148.4 A, 148.4 C

[56] References Cited

U.S. PATENT DOCUMENTS

| | | | |
|---|---|---|---|
| 3,206,263 | 9/1965 | Altson | 308/217 |
| 3,256,052 | 6/1966 | Howles | 308/217 |
| 3,295,899 | 1/1967 | Knowles et al. | 308/217 |
| 3,659,912 | 5/1972 | Scheifele | 308/217 |

FOREIGN PATENT DOCUMENTS

2450079  4/1975  Fed. Rep. of Germany ........... 308/217

Primary Examiner—Charles E. Frankfort
Attorney, Agent, or Firm—Mason, Fenwick & Lawrence

[57] ABSTRACT

A cylindrical roller bearing has inner and outer rings, cylindrical rollers, and a retainer having a pair of annular members positioned close to and disposed along the opposite ends of the cylindrical rollers provided in a circular arrangement within the annular space between the inner ring and the outer ring. The annular members of the retainer are provided with cantilever projections each positioned at a radially outward portion of each space between adjacent rollers in opposed relation to beam portions connecting the annular members with the projections extending between the peripheral end surfaces of the adjacent rollers for retaining the rollers in pockets formed by the annular members and the beam portions.

5 Claims, 13 Drawing Figures

CYLINDRICAL ROLLER BEARINGS

CROSS REFERENCE TO RELATED APPLICATION

This application is a continuation-in part of earlier U.S. patent application Ser. No. 828,965, filed on Aug. 29, 1977 which is now abandoned.

BACKGROUND OF THE INVENTION

Cylindrical roller bearings are known which include retainers adapted to be guided by the raceway surface of the outer ring or of the inner ring in contact therewith as disclosed in U.S. Pat. No. 3,675,292. The roller bearing of this type has the feature of being relatively smoothly movable during the rotation of the bearing since the retainer is guided by the raceway surface. However, the retainer involves sliding friction between the race riding surface thereof and the riding land for the retainer, in addition to the sliding friction which occurs between the rollers and the pocket defining surfaces of the retainer. The increased surface area giving rise to sliding friction results in a rise in the temperature of the bearing and causes greater wear on the retainer. The resulting heat generation and particles of worn metal act to accelerate the degradation of the lubricant. The sliding surfaces are prone to thermal adhesion which renders the bearing inoperative earlier. Especially when the bearing is installed in a tilted position, thermal adhesion is liable to take place between the race riding surface of the retainer and riding land therefor.

U.S. Pat. No. 3,647,273 discloses a roller bearing comprising retainer rings and space bar members which are made as separate pieces, such that rollers are first inserted into pockets and the retainer rings and the spacer bar members are thereafter connected together with rivets or like means. This roller bearing is cumbersome to assemble because the retainer rings and the space bar members, which are separate from each other, must be assembled. Additionally, when the roller bearing incorporating the resulting retainer is used under severe conditions as at a high rotation speed, the connecting portions are susceptible to loosening, damage or like trouble. Thus, the retainer of this type has the drawback of having low rigidity.

Cylindrical roller bearings are so designed that one of the inner and outer bearing rings is detachable as desired, such that when the inner ring, for example, is removed, the remaining parts including the outer ring, rollers and retainer will be held assembled as a unit, because the assembled unitary structure renders the bearings very advantageous to handle for transport or installation into machines. To ensure this advantage, the retainer must be provided with means for retaining the rollers in its pockets once the rollers have been placed therein.

When such bearings are installed into machines, the detached inner ring and the assembly of the outer ring, rollers and retainer are assembled into a bearing as installed in place. However, with bearings in which the rollers are movable by a great amount radially of the bearing, it is extremely difficult and therefore takes much time to fit the inner ring or rotary shaft in place. In order to reduce the radial movement of the rollers, there arises the necessity of positioning the roller retaining means close to the pitch circle of the rollers to the greatest possible extent, but if the retainer is so designated, the radial distance between the space bar member and the roller retaining means reduces, with the inevitable result that the retainer ring will have a smaller radial dimension and limited strength.

In brief, with retainers heretofore known, it has been extremely difficult to design means by which the rollers can be held on the retainer without being allowed to drop off the retainer radially of the bearing while the retainer is being handled after the rollers have been placed in the pockets of the retainer and also to design means for adjusting the movement of the rollers radially of the bearing when the bearing is to be installed into a machine so as to render the bearing easy to install.

SUMMARY OF THE INVENTION

The present invention relates to cylindrical roller bearings free of the foregoing problems.

An object of this invention is to provide a cylindrical roller bearing having a retainer in which retainer rings and beam portions serving as space bar members are made as an integral piece without using any rivets or like fastening means and which is movable by being guided solely by the rollers during the rotation of the bearing, the retainer therefore having improved strength and involving reduced heat generation and wear due to a reduction in the area of sliding friction surfaces.

Another object of this invention is to provide a cylindrical roller bearing having a roller retainer in which means for retaining the rollers and means for adjusting the movement of the rollers radially of the bearing have a relatively simple construction which can be designed without limiting the desired design of the retaining rings and the beam portions, the retainer therefore being simple, rigid and strong in its entirety so as to be very advantageously operable when the bearing is driven at a high speed and under heavy load and to render the bearing installable in machines with extreme ease.

DESCRIPTION OF THE PREFERRED EMBODIMENTS

Figure 1:
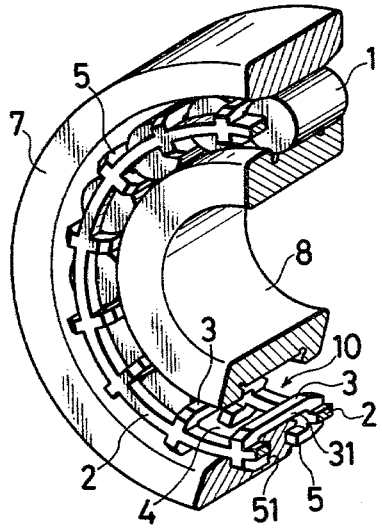
FIG. 1 is a perspective view partly broken away to show an embodiment of this invention.
Figure 2:
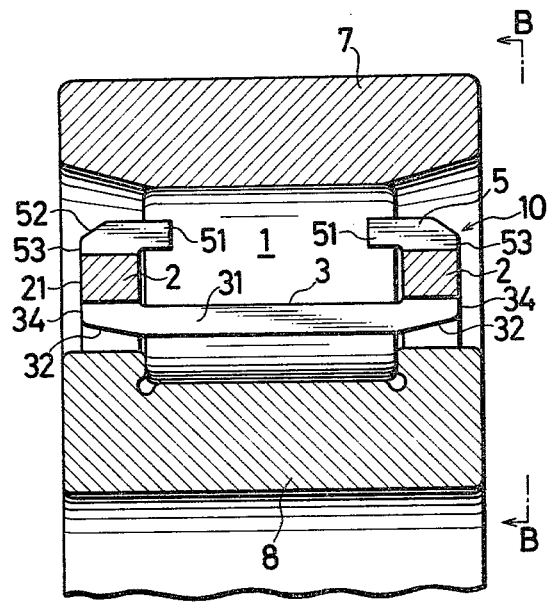
FIG. 2 is an enlarged view in section taken along the line A—A in FIG. 3.
Figure 3:
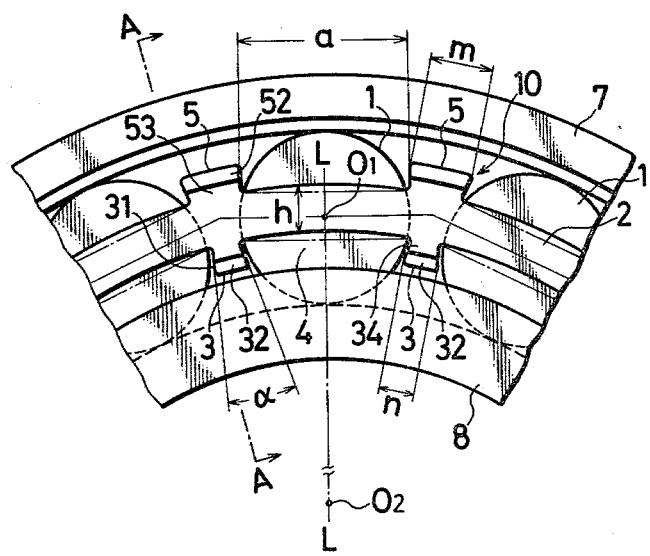
FIG. 3 is a side elevation of the embodiment as it is seen in the direction of the line B—B in FIG. 2.

FIGS. 1 to 3 show a cylindrical roller bearing of this invention.

A retainer generally designated at 10 comprises a pair of annular members 2 disposed close to the outside ends of rollers 1, a plurality of beam portions 3 extending from the inner peripheries of the annular members 2 and connecting the members 2 together axially of the bearing to provide roller pockets 4 as arranged circumferentially of the bearing, and a plurality of cantilever projections 5 disposed on the outer peripheries of the annular members 2 radially outward thereof and extending from the annular members 2 in pairs opposed to each other axially inwardly of the bearing. The projection 5 serve to retain the rollers 1 in the pockets 4 of the retainer 10 against dropping off therefrom and also adjust the amount of radial movement of the rollers 1 within the pockets 4. The beam portions 3 and projections 5 are shaped integrally with the annular members 2 from a solid annular piece by machine work. The side faces 31 of the beam portions 3 defining the pockets 4 extend from the inner peripheries of the annular members 2 inward centripetally thereof and are adapted to guide the rollers 1 in the pockets 4. As seen in FIG. 3, two circumferentially adjacent projections 5 and 5 have side faces parallel to a line L passing through the center $O_1$ of the immediately adjacent roller 1 and through the center $O_2$ of the bearing. The spacing a between the side faces facing each other is suitably smaller than or substantially equal to the diameter of the roller 1. After the rollers 1 have been placed into the pockets 4, the inner ends 51 of the projections 5 are plastically deformed to a shape as shown in FIGS. 4 to 10 to retain the rollers 1 in the pockets 4, preventing them from dropping therefrom in the radial direction. The amount of the movement of the rollers 1 radially of the bearing is adjustable by suitably adjusting the amount of plastic deformation of the projection ends 51 in the circumferential direction of the retainer 10.

The retainer 10 of the construction described above, even when adapted for a large number of rollers 1 that is even when having a large number of pockets 4 for use in a roller bearing of great load capacity, can easily adjust the amount of movement of the rollers 1 in the radial direction of the bearing as will be described below and nevertheless retains satisfactory strength.

It is noted that the projection 5 is positioned on the outer peripheries of the annular members 2 projected radially outward thereof and has a side face in parallel to the line L through the center $O_1$ of the adjacent roller 1 and through the center $O_2$ of the bearing. Accordingly, even when the adjacent pockets 4 and 4 are circumferentially spaced apart by a small distance, the width m of the projection 5 can be large. This easily enables the projections 5 to retain the rollers 1 in the pockets 4 without allowing the rollers to drop off the retainer radially outward of the bearing and to adjust the amount of movement of the rollers 1 in the radial direction of the bearing, when the projections are plastically deformed at the inner ends 51 for example to one of the shapes shown in FIGS. 4 to 10. The ends 51 will then have enhanced rigidity. When it is attempted to increase the width h of the annular members 2 to give the retainer enhanced rigidity in its radial direction, the foregoing structure ensures a greater freedom of design, because the greater the width h of the annular members 2, the greater will be the width m of the projections 5. On the other hand, the beam portions 3, which are formed on the inner peripheries of the annular members 2, will invariably have a reduced width n if the circumferential spacing between the adjacent pockets 4 and 4 is smaller. However, because the side faces 31 of the beam portions 3 partly defining the pockets 4 are so inclined as to suitably guide the rollers in the pockets 4 such that the opposite side faces 31 of the beam portions 3 form an angle $\alpha$ for example of at least 30 deg, the beam portions 3 retain sufficient strength even if the width n thereof is small.

Figure 11:
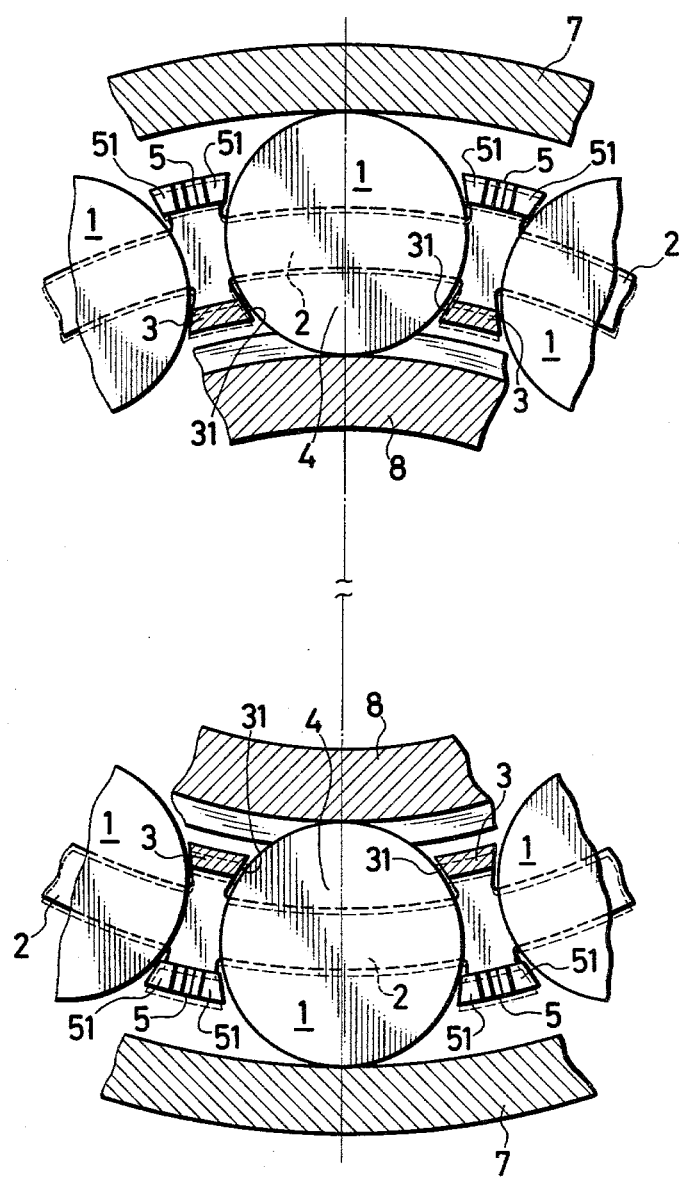
FIG. 11 is a view showing an example of the movement of the retainer used in the cylindrical roller bearing of this invention.

The retainer 10 of the construction described above is designed so that the circumferential and radial clearances between the opposed side faces 31, 31 of adjacent beam portions 3 and the roller 1 retained therebetween are smaller than the circumferential and radial clearances between the deformed inner ends 51, 51 of opposed and adjacent projections 5 and said roller 1. Accordingly, the retainer 10 is guided by the rollers 1 during the rotation of the bearing in such a manner that the side faces 31 of the beam portions 3 are in contact with the rollers 1 while the deformed inner ends 51 of the projections 5 are kept out of contact with the rollers 1. Further, even if the retainer 10 is displaced relative to and radially of the rollers 1 as shown in broken lines in FIG. 11 during the rotation of the bearing, the construction described above will prevent contact between the deformed inner ends 51 of the projections 5 and the rollers 1.

Needless to say, the retainer 10 has an outside diameter smaller than the inside diameter of the outer ring 7 and an inside diameter greater than the outside diameter of the inner ring 8 and is guided by the rollers 1 free of any contact with the inner and outer rings 7 and 8.

The shapes to which the inner ends 51 of the projections 5 are deformed will be described below with reference to FIGS. 4 to 10.

Figure 4:
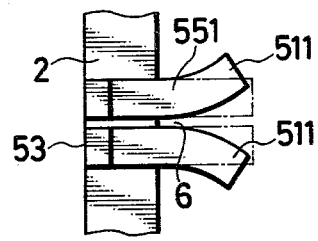
FIGS. 4 to 9 are plan views each showing the shape of a projection.
Figure 5:
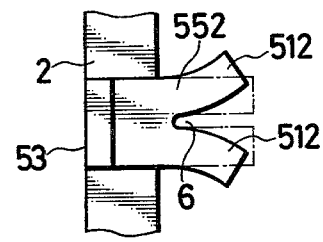
Figure 6:
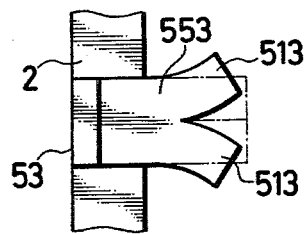
Figure 7:
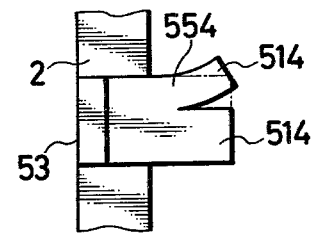
Figure 8:
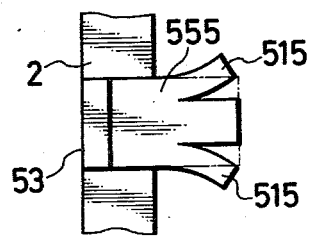
Figure 9:
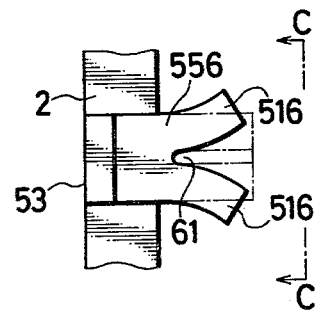
Figure 10:
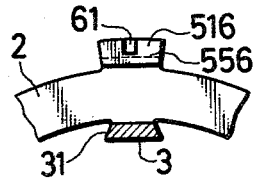
FIG. 10 is a side elevation of the projection shown in FIG. 9 as it is seen in the direction of the line C—C in FIG. 9.

FIG. 4 shows a projection 551 formed with a center clearance 6 of suitable width extending over the entire axial length of the projection 551. The end portions 511 of the projection 551 are opened away from each other circumferentially of the retainer. FIG. 5 shows a projection 552 having a similar clearance 6 formed only in the part of the projection end to be plastically deformed and end portions 512 similarly opened. The provision of the clearance 6 makes it easy to open the end portions 511 or 512 by plastic deformation without subjecting the projection 551 or 552 to the deforming force where unnecessary and therefore without reducing the dimensional accuracy of the retainer. Accordingly, the projections 551 and 552 of the shapes shown in FIGS. 4 and 5 are useful when the projection has a relatively large width to adjust the amount of movement of the rollers 1 to a small value in the radial direction of the bearing. FIGS. 6 to 8 show projections having their ends opened with a triangular wedge forced thereinto axially thereof. FIG. 6 shows a projection 553 having divided two end portions 513 which are opened. FIG. 7 shows a projection 554 having divided two end portions 514 one of which alone is opened in the circumferential direction. FIG. 8 shows a projection 555 having divided end portions 515 formed by being wedged at two points. Like the projections 551 and 552 shown in FIGS. 4 and 5, the projection 555 is useful when having a relatively large width. With the embodiments shown in FIGS. 4 and 5 and already described, the clearance 6 extends through the projection radially of the bearing, whereas FIGS. 9 and 10 show a projection 556 in which a clearance 61 is formed only in a radially outer side of the projection to provide end portions 516 by forcing the clearance 61 open. The clearance 61 can be formed with greater ease as by broaching.

Figure 12:
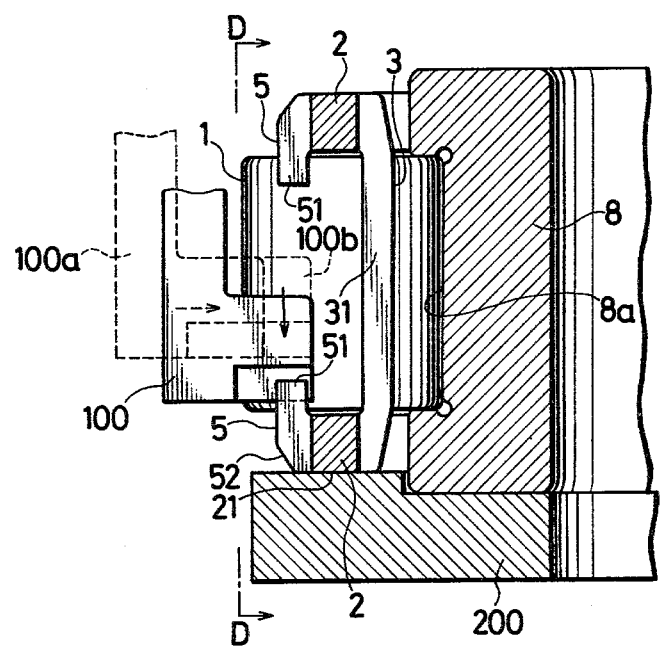
FIG. 12 is a view showing how the cylindrical roller bearing of this invention is assembled.
Figure 13:
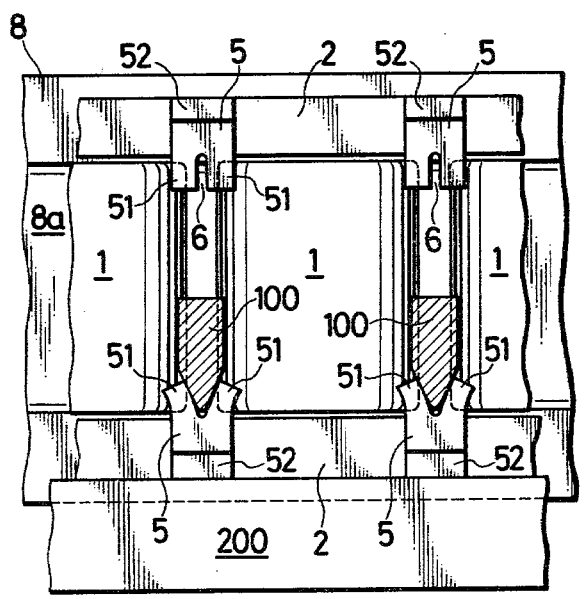
FIG. 13 is a developed sectional view taken in the direction of the line D—D in FIG. 2.

This invention also discloses a new method of assembling cylindrical roller bearings. When rollers 1 are to be assembled to the inner ring 8 having a recessed raceway, as shown in FIG. 12, a retainer 10 corresponding to that shown in the embodiment of FIGS. 2 and 3 is positioned concentrically around said inner ring 8. The rollers 1 are then inserted respectively into the pockets 4 defined by the beam portions 3 and projections 5 of the retainer 10 radially from the outside of said pockets so that respective portions of the peripheries of the rollers engage the raceway 8a. The resulting subassembly of the inner ring 8, retainer 10 and rollers 1 is then placed on a support block 200 with its axis vertically directed. Subsequently, a wedge tool 100 for plastic deformation of the inner ends of the projections 5 on the retainer 10 is moved from its dotted line position 100a as indicated by a dotted line arrow 100b, whereupon the wedge tool is driven as indicated by a solid line arrow, or downwardly as seen in FIG. 12, into the clearance 6 of the projection 5, thereby plastically deforming the inner end portions 51 of said projection 5, as shown in FIG. 13. In FIG. 13, which is a sectional view taken along the line D—D in FIG. 12, circumferential portions of the inner ring 8 and retainer 10 are shown developed. Plastic deformation of the opposite side, i.e., of the upper projections 5 in FIGS. 12 and 13 may be achieved by placing said subassembly upside down on the support block 200 and similarly operating said wedge tool 100. It will be understood that as a result of the inner ends 51 of the projections 5 being thus forced apart, the rollers 1 are no longer capable of being radially released. Thereafter, the outer ring 7 having an inside diameter substantially equal to the rolling circle diameter of the rollers 1 as assembled is then assembled to complete a cylindrical roller bearing such as the one shown in FIG. 2.

Plastic deformation of the projections 5 by the wedge tool 100 has been described as being effected one by one. Needless to say, it is also possible and more preferable to use a multiple wedge tool which is adapted to be forced radially into all the clearances 6 of the projections 5 at the same time.

What is important in the method of assembling roller bearings according to the invention, if stated with reference to FIGS. 12 and 13, is that the inner ends 51 of the projections 5 are plastically deformed to effectively adjust the amount of radial movement of the rollers 1 in the pockets 4 and that the amount of deformation is so adjusted that the circumferential and radial clearances between the deformed inner ends 51 and rollers 1 are not smaller than the circumferential and radial clearances between the oppsed side faces of the beam portions 3 and rollers 1.

With the retainer of the construction described above, the outer end faces 53 of the projections 5 are flush with the outer side face 21 of the annular member 2 and outer end faces 34 of the beam portions 3, all these faces being positioned on the same plane extending radially of the bearing. Accordingly the support face of the support means bears against the entire side face of the retainer in uniform contact therewith against the axial wedging force on the projections 5, without permitting the force to produce any influence on the annular member 2 or the beam portions 3. As a result, the amount of movement of the rollers 1 in the radial direction of the bearing is adjustable by plastic deformation of the projection inner ends 51 free of any possibility of impairing the dimensional accuracy of the retainer.

The retainer 10 having the construction described is typically in the form of a circular frame including annular members 2 positioned in parallel to the opposite ends of the rollers respectively and beam portions 3 connecting the members 2 together and defining roller pockets 4. Indicated in dot-and-dash lines in FIG. 3 is a modification of the annular member 2 in which each portion thereof between the adjacent beam portions 3 and 3 is straight.

The opposite ends of the beam portions 3 may be slanted as at 32 on the outer side thereof, i.e. inward radially of the bearing, while the projections 5 may be similarly slanted as at 52 on the outer side, i.e. at the shoulder portions thereof, whereby the retainer can be reduced in its weight without producing any adverse effect on the strength of the retainer.

Because of the foregoing construction, the retainers are guided by the rollers in the pockets free of any contact with the inner and outer rings and therefore free of objections such as a rise of retainer temperature, degradation of the lubricant and wear which will be caused by sliding friction in retainers adapted to be guided by the bearing ring as already stated. The retainer has high strength and is fully serviceable even under severe conditions since it is made from a single solid annular material by machining in the form of a single piece including beam portions, annular members and projections.

The projections for retaining the rollers in position and adjusting the amount of movement of the rollers radially of the bearing axially extend only by a small amount. The beam portions defining the roller pockets and guiding the rollers are of simple structure in that the side faces thereof are in the form of a surface inclined or bent at a suitable specified angle. With these structural features, the retainer is very easy to make, lightweight and compact in construction.

The rollers are retainable in place and are freely adjustable in the amount of radial movement merely by plastically deforming the projections only. This assures that the dimensions of the beam portion and the radial dimension of the annular member will be determinable as desired in conformity with the use of the bearing in which the retainer is to be incorporated, while ensuring the desired strength of the retainer.

What is claimed is:

1. A cylindrical roller bearing comprising inner and outer rings, a plurality of rollers positioned between said inner and outer rings, a one-piece machined retainer positioned between said inner and outer rings and having pockets for retaining the rollers arranged between the inner and outer rings of the bearing, said retainer being positioned out of contact with the inner and outer rings, said retainer comprising a pair of annular members disposed close to the opposite ends of the rollers, beam portions integrally extending from the radially inner peripheries of the annular members at equal spacing circumferentially thereof and having side faces defining the roller pockets and shaped at an angle to support the rollers, and cantilever projections axially extending a substantial distance over the rollers from the outer radial peripheries of the annular members from which they project integrally in parallel opposed relation to the beam portions so as to prevent the rollers from dropping out of the roller pockets and limit the amount of radial movement of the rollers therein, the opposite ends of the beam portions being slanted on the outer side thereof, the cantilever projections providing larger circumferential and radial clearances to the roller than the clearances between the opposite side faces of the beam portions and the roller whereby the contact between the cantilever projections and the rollers is prevented during the rotation of the bearing.

2. A cylindrical roller bearing as defined in claim 1 wherein each of the annular members is a circular member of rectangular cross-section substantially aligned with the pitch circle of the rollers and concentric therewith.

3. A cylindrical roller bearing as defined in claim 1 wherein the inner ends of the cantilever projections are bifurcated and outwardly spread in the circumferential direction of the bearing.

4. A cylindrical roller bearing as defined in claim 1 wherein the cantilever projections have slanting shoulder portions.

5. A cylindrical roller bearing as defined in claim 1 wherein the annular members have a straight portion between each two circumferentially adjacent beam portions.

* * * * *